(12) United States Patent
Nishida et al.

(10) Patent No.: US 8,428,035 B2
(45) Date of Patent: Apr. 23, 2013

(54) MOBILE COMMUNICATION METHOD, RADIO ACCESS NETWORK APPARATUS AND MOBILE STATION

(75) Inventors: Katsutoshi Nishida, Tokyo (JP);
Shimpei Kawakatsu, Yokohama (JP);
Kenichi Katayama, Fujisawa (JP);
Kenichiro Aoyagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/578,054

(22) PCT Filed: Feb. 9, 2011

(86) PCT No.: PCT/JP2011/052774
§ 371 (c)(1),
(2), (4) Date: Oct. 25, 2012

(87) PCT Pub. No.: WO2011/099529
PCT Pub. Date: Aug. 18, 2011

(65) Prior Publication Data
US 2013/0039301 A1 Feb. 14, 2013

(30) Foreign Application Priority Data
Feb. 9, 2010 (JP) .............................. P2010-027047

(51) Int. Cl.
*H04B 7/216* (2006.01)

(52) U.S. Cl.
USPC ........................................................ 370/335

(58) Field of Classification Search .................. 370/310, 370/328–350, 401; 455/436–444
See application file for complete search history.

(56) References Cited

U.S. PATENT DOCUMENTS

| | | | | |
|---|---|---|---|---|
| 8,306,537 B2* | 11/2012 | Burbidge et al. | ............ | 455/436 |
| 2010/0113010 A1* | 5/2010 | Tenny et al. | ................... | 455/423 |
| 2010/0182971 A1* | 7/2010 | Chin | .............................. | 370/329 |
| 2010/0202413 A1* | 8/2010 | Vikberg et al. | ............... | 370/332 |
| 2010/0279648 A1* | 11/2010 | Song et al. | ................. | 455/404.1 |
| 2010/0297979 A1* | 11/2010 | Watfa et al. | ................ | 455/404.1 |
| 2011/0069618 A1* | 3/2011 | Wong et al. | ................... | 370/244 |
| 2011/0216645 A1* | 9/2011 | Song et al. | ................... | 370/216 |
| 2012/0002545 A1* | 1/2012 | Watfa et al. | ................... | 370/235 |
| 2012/0064884 A1* | 3/2012 | Ramachandran et al. | . | 455/422.1 |

FOREIGN PATENT DOCUMENTS
WO 2008/156402 A1 12/2008
WO 2009/081268 A1 7/2009

OTHER PUBLICATIONS
International Search Report w/translation from PCT/JP2011/052774 dated Apr. 19, 2011 (2 pages).
3GPP TS 23.272 V9.2.0; "3rd Generation Partnership Project; Technical Specification Group Services and System Aspects; Circuit Switched Fallback in Evolved Packet System; Stage 2 (Release 9)"; Dec. 2009 (64 pages).
Office Action w/English translation mailed on Apr. 19, 2011 in corresponding Japanese Application No. 2010-027047 (4 pages).
Office Action w/English translation mailed on Apr. 19, 2011 in corresponding Japanese Application No. 2010-291160, which is a Divisional Application of Priority Claimed Application No. JP2010-027047 (5 pages).

* cited by examiner

*Primary Examiner* — Frank Duong
(74) *Attorney, Agent, or Firm* — Osha Liang LLP

(57) ABSTRACT

A mobile communication method according to the present invention includes the steps of: transmitting an "Extended Service Request" from a mobile station UE in Idle mode to a mobility management node MME via a radio base station eNodeB; transmitting an "Initial UE Context Setup Request" from the mobile station UE to the radio base station eNodeB, the "Initial UE Context Setup Request containing priority call information; and preferentially allocating resources to the E-RAB for the mobile station UE by the radio base station eNodeB based on the priority call information contained in the received "Initial UE Context Setup Request."

4 Claims, 14 Drawing Sheets

MOBILE COMMUNICATION METHOD, RADIO ACCESS NETWORK APPARATUS AND MOBILE STATION

TECHNICAL FIELD

The present invention relates to a mobile communication method, a radio access network apparatus and a mobile station.

BACKGROUND ART

For mobile communication systems of LTE (Long Term Evolution) standard, "CS Fallback (CSFB)procedures"have been specified in order for a mobile station UE in Idle mode on E-UTRAN (Evolved Universal Terrestrial Radio Access Network) not supporting circuit-switched type of communications to perform circuit-switched type of communications.

SUMMARY OF THE INVENTION

Problems to be Solved by the Invention

According to the above CSFB procedure, it is necessary to set up an "E-RAB (Evolved Radio Access Bearer)" that is a radio bearer on E-UTRAN first, and thereafter to set up a "RAB (Radio Access Bearer)" that is a radio bearer on UTRAN (Universal Terrestrial Radio Access Network) or GERAN (GSM EDGE Radio Access Network).

The CSFB procedure, however, has a problem of being unable to preferentially allocate resources to the setup processing of the E-RAB as a packet bearer and the setup processing of the RAB as a packet bearer.

Likewise, the CSFB procedure has another problem of being unable to preferentially establish RRC (Radio Resource Control) connection for transmission of a signal to request a start of circuit-switched type of communications from a prioritized mobile station UE.

With reference to FIGS. 12 to 14, these problems will be described in detail.

Firstly, FIG. 12 shows part of operations of a CSFB procedure involved in originating call processing for a prioritized mobile station UE in the foregoing mobile communication system.

The CSFB procedure has a problem that an E-RAB to serve as a packet bearer for the prioritized mobile station UE cannot be set up in E-RAB setup processing if resources necessary for E-RAB setup are short, as shown in a part A in FIG. 12.

In addition, the CSFB procedure has another problem that a RAB to serve as a packet bearer for the prioritized mobile station UE cannot be set up in RAB setup processing if resources necessary for RAB setup are short, as shown in a part B in FIG. 12.

Moreover, the CSFB procedure has still another problem that a radio network controller RNC cannot establish RRC connection for transmission of a handover control signal from the prioritized mobile station UE if the RRC function on the UTRAN side is congested, as shown in a part C in FIG. 12.

Secondary, FIG. 13 shows part of operations of a CSFB procedure involved in terminating call processing for a prioritized mobile station UE in Idle mode in the foregoing mobile communication system.

The CSFB procedure has a problem that a radio base station eNodeB cannot establish RRC connection for transmission of a handover control signal from the prioritized mobile station UE if the RRC function on the E-UTRAN side is congested, as shown in a part A in FIG. 13.

Moreover, the CSFB procedure has another problem that an E-RAB to serve as a packet bearer for the prioritized mobile station UE cannot be set up in E-RAB setup processing if resources necessary for E-RAB setup are short, as shown in a part B in FIG. 13.

Further, the CSFB procedure has still another problem that a RAB to serve as a packet bearer for the prioritized mobile station UE cannot be set up in RAB setup processing if resources necessary for RAB setup are short, as shown in a part C in FIG. 13.

Furthermore, the CSFB procedure has yet another problem that the radio network controller RNC cannot establish RRC connection for transmission of a handover control signal from the prioritized mobile station UE if the RRC function on the UTRAN side is congested, as shown in a part D in FIG. 13.

Thirdly, FIG. 14 shows part of operations of a CSFB procedure involved in terminating call processing for a prioritized mobile station UE in Active mode in the foregoing mobile communication system. In this CSFB procedure, the E-RAB for the prioritized mobile station UE is already set up.

In this CSFB procedure, if the radio base station eNodeB detects shortage of resources necessary for RAB setup on UTRAN on the occasion of receiving a "Context Modification Request" including a "CSFB Indicator," the radio base station eNodeB cannot preferentially perform control processing necessary for handover for the subsequent packet communications as shown in a part A in FIG. 14.

Hence, the present invention has been made in consideration of the foregoing problems, and has an objective to provide a mobile communication method, a radio access network apparatus and a mobile station which, in a CSFB procedure for communications to be prioritized such as an originating call or terminating call of a prioritized mobile station, enable preferential setup of E-RAB and RAB as packet bearers and priority control for a RRC signal in the CSFB procedure.

Means for Solving the Problems

A first feature of the present invention is a mobile communication method including the steps of: transmitting a start request signal for circuit-switched type of communications from a mobile station in Idle mode to a mobility management node via a radio access network apparatus of a first communication system that does not support circuit-switched type of communications; transmitting a radio bearer setup request signal from the mobility management node to the radio access network apparatus of the first communication system, the radio bearer setup request signal containing priority call information and requesting setup of a radio bearer of the first communication system between the mobile station and the radio access network apparatus of the first communication system; and preferentially allocating resources to a radio bearer of the first communication system, by the radio access network apparatus of the first communication system based on the received priority call information.

A second feature of the present invention is summarized as including the steps of: transmitting a start request signal for circuit-switched type of communications from mobile station to a mobility management node via a radio access network apparatus of a first communication system that does not support, circuit-switched type of communications, the mobile station having a radio bearer of the first communication system already set up between the mobile station and the radio access network of the first communication system; transmitting a setting modification request signal containing priority call information from the mobility management node to the radio access network apparatus of the first communication system; determining, by the radio access network apparatus of the first communication system, whether or not there are available resources on a second communication system that supports circuit-switched type of communications, in response to the received setting modification request signal; and performing a procedure of releasing the radio bearer of the first communication system in the case where the priority call information is contained in the setting modification request signal even through it is determined that there are no available resources on the second communication system.

A third feature of the present invention is a radio access network apparatus of a first communication system that does not support circuit-switched type of communications, the radio access network apparatus summarized as being configured to: send a mobility management node a start request signal for circuit-switched type of communications received from a mobile station in Idle mode; receive a radio bearer setup request signal from the mobility management node, the radio bearer setup request containing priority call information and requesting setup of a radio bearer of the first communication system between the mobile station and the radio access network apparatus of the first communication system; and preferentially allocate resources to the radio bearer of the first communication system based on the priority call information contained in the received radio bearer setup request signal.

A fourth feature of the present invention is a radio access network apparatus of a first communication system that does not support circuit-switched type of communications, the radio access network apparatus summarized as being configured to: send a mobility management node a start request signal for circuit-switched type of communications received from a mobile station having a radio bearer of the first communication system between the mobile station and the radio access network apparatus of the first communication system; determine whether or not there are available resources on a second communication system that supports circuit-switched type of communications in response to a setting modification request signal received from the mobility management node; and perform a radio bearer release procedure of the first communication system if priority call information is contained in the setting modification request signal even though it is determined that there are not available resources on the second communication system.

A fifth feature of the present invention is a radio access network apparatus of a second communication system that supports circuit-switched type of communications, the radio access network apparatus summarized as being configured to: after a radio bearer of a first communication system that does not support circuit-switched type of communications is set up between a mobile station and a radio access network apparatus of the first communication system, receive a handover request signal containing priority call information from the radio access network apparatus of the first communication system via the mobility management node and a packet switch of the second communication system; and preferentially allocate resources to a radio bearer of the second communication system between the mobile station and the radio access network apparatus of the second communication system based on the priority call information contained in the received handover request signal.

A sixth feature of the present invention is a mobile station summarized as being configured to transmit a start request signal for circuit-switched type of communications to a mobility management node via a radio access network apparatus of a first communication system that does not support circuit-switched type of communications; and if priority call information is contained in a handover request signal received from the radio access network apparatus of the first communication system even though an access to a second communication system that supports circuit-switched type of communications is restricted, transmit a response signal to the handover request signal to a radio access network apparatus of the second communication system.

Effects of the Invention

As has been described above, according to the present invention, it is possible to provide a mobile communication method, a radio access network apparatus and a mobile station which, in a CSFB procedure for communications to be prioritized such as an originating call or terminating call of a prioritized mobile station, enable preferential setup of E-RAB and RAB as packet bearers and priority control for a RRC signal in the CSFB procedure.

MODES FOR CARRYING OUT THE INVENTION (Mobile Communication System according to First Embodiment of the Present Invention)

In reference to FIGS. 1 to 11, description will be provided for a mobile communication system according to a first embodiment of the present invention. The mobile communication system according to this embodiment includes both E-UTRAN and UTRAN.

Figure 1:
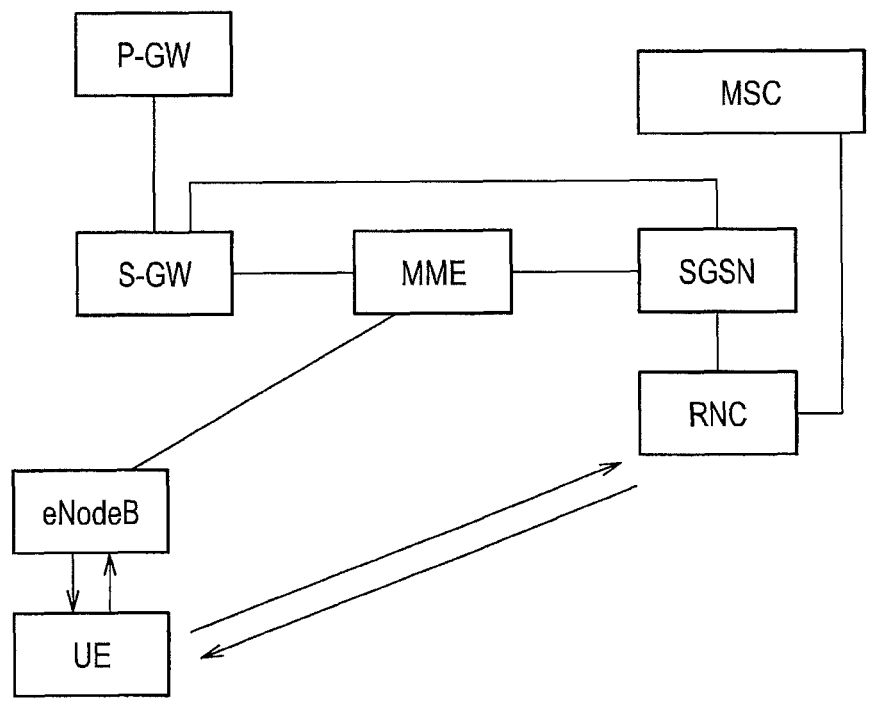
FIG. 1 is an overall configuration diagram of a mobile communication system according to a first embodiment of the present invention.

Specifically, as shown in FIG. 1, the mobile communication system according to this embodiment includes a gateway device P-GW (PDN Gateway), a serving gateway device S-GW (Serving Gateway), a mobility management node MME (Mobility Management Entity), a radio base station eNodeB, a circuit switching device MSC (Mobile-service Switching Center), a packet switch SGSN (Serving GPRS Support Node), a radio network controller RNC, and a radio base station NodeB (not illustrated).

Figure 2:
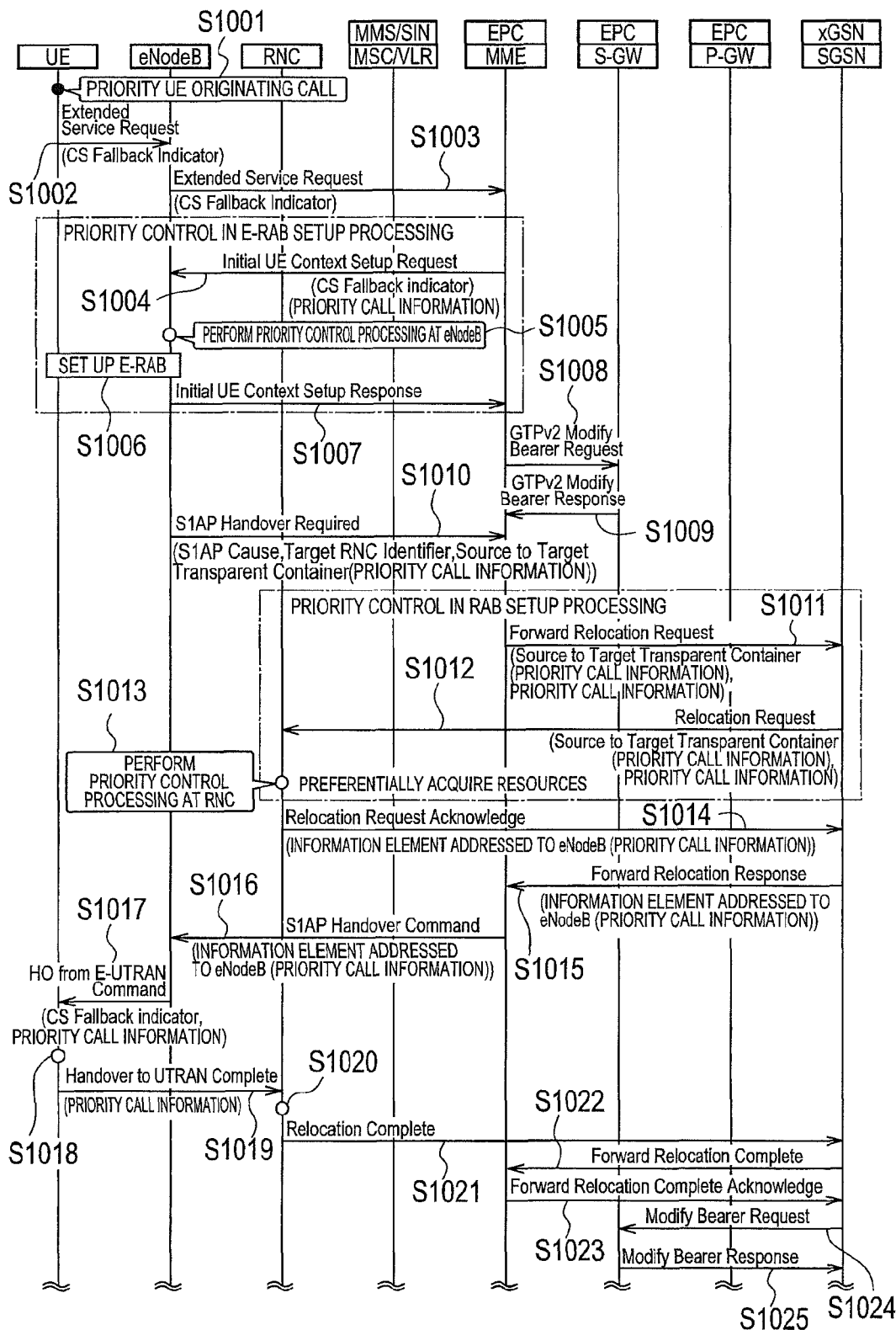
FIG. 2 is a sequence diagram showing operations of the mobile communication system according to the first embodiment of the present invention.

In the first place, in reference to FIG. 2, description will be provided for part of operations of a CSFB procedure involved in originating call processing of a prioritized mobile station UE in the mobile communication system according to this embodiment.

As shown in FIG. 2, when a prioritized mobile station UE in Idle mode on E-UTRAN detects execution of an originating call operation for starting circuit-switched type of communications in step S1001, the prioritized mobile station UE transmits an "Extended Service Request" containing a "CSFB Indicator" to the radio base station eNodeB in step S1002.

In step 1003, the radio base station eNodeB transmits the "Extended Service Request" containing the "CSFB Indicator" to the mobility management node MME.

In step S1004, if the mobility management node MME determines that the CSFB procedure should be prioritized by referring to "connection cause information (for example, cause=priority connection)" or "connection type information (for example, an originating call for emergency call)" which is contained in the signal received in step S1003, "subscriber profile information held by the mobility management node MME (for example, a priority user)," or the like, the mobility management node MME transmits an "Initial UE Context Setup Request" containing the "CSFB Indicator" and priority call information to the radio base station eNodeB.

In step S1005, the radio base station eNodeB performs priority control processing for the received "Initial UE Context Setup Request."

Figure 3:
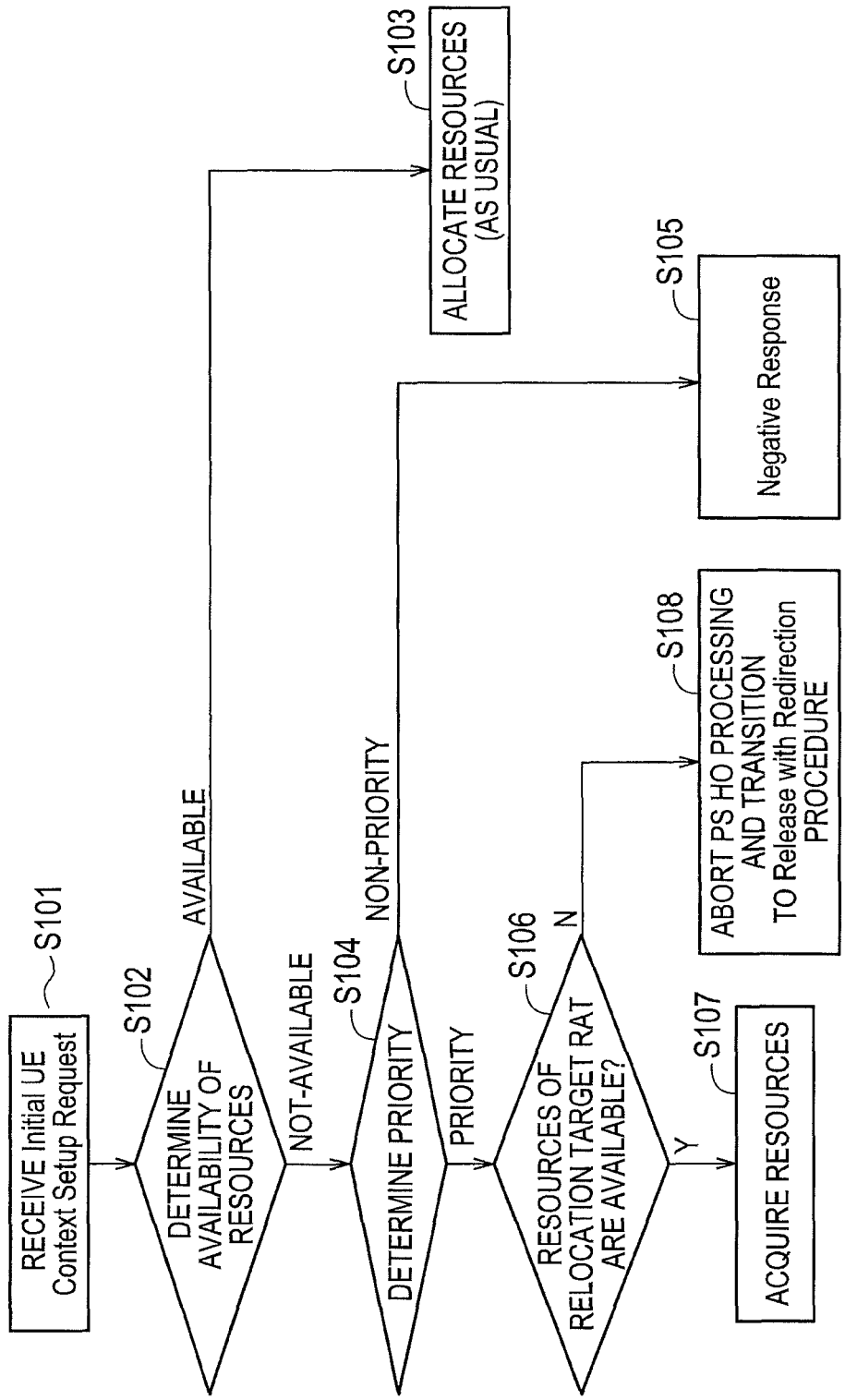
FIG. 3 is a flowchart showing an operation of a radio base station eNodeB in the mobile communication system according to the first embodiment of the present invention.
Figure 4:
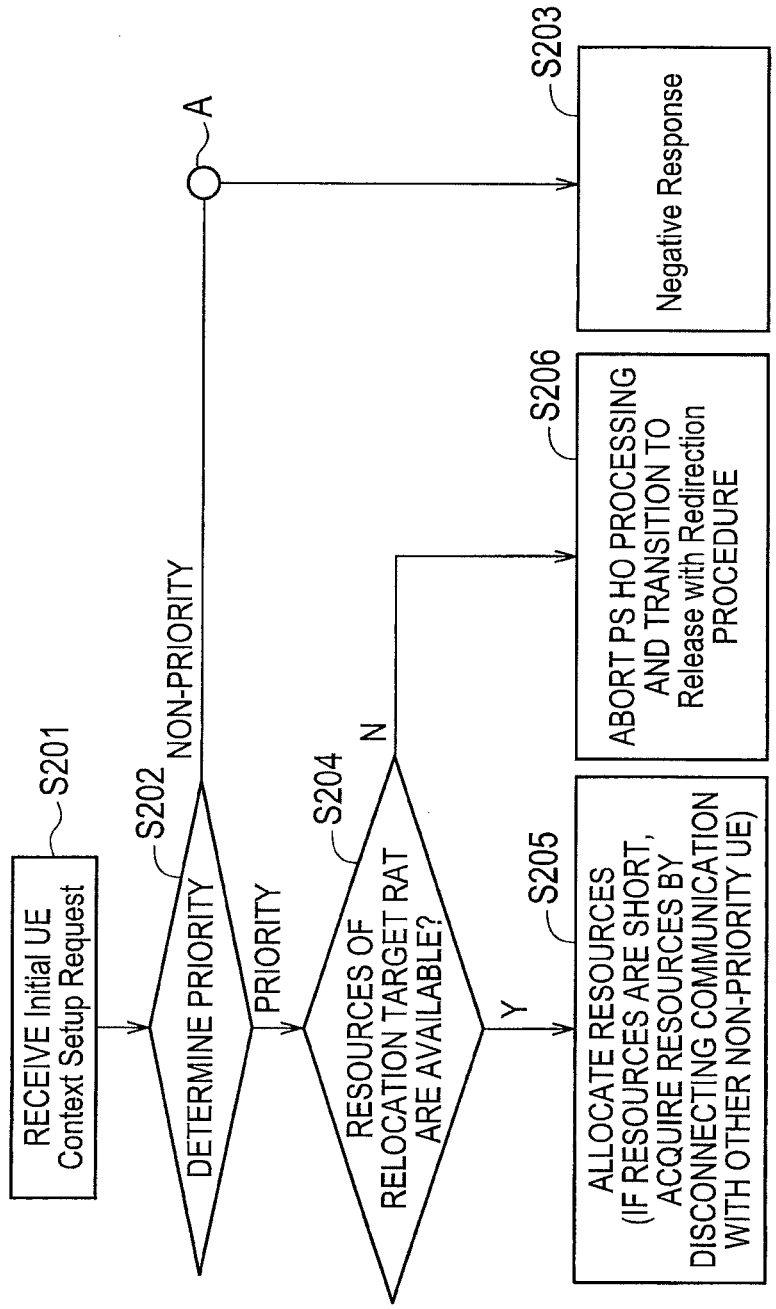
FIG. 4 is a flowchart showing an operation of the radio base station eNodeB in the mobile communication system according to the first embodiment of the present invention.

Here, the priority control processing for the "Initial UE Context Setup Request" is explained in reference to FIGS. 3 and 4.

Firstly, a first example of the priority control processing is explained in reference to FIG. 3.

As shown in FIG. 3, when the radio base station eNodeB receives an "Initial UE Context Setup Request" in step S101, the radio base station eNodeB determines whether or not resources necessary for E-RAB setup are available in step S102.

When determining that such resources are available, the radio base station eNodeB performs usual processing of allocating resources to an E-RAB in step S103.

On the other hand, when determining that such resources are not available, the radio base station eNodeB determines whether or not the priority call information is contained in the "Initial UE Context Setup Request" in step S104.

When determining that the priority call information is not contained, the radio base station eNodeB sends the mobility management node MME a "Negative Response" indicating that the resource allocation is not possible in step S105.

On the other hand, when determining that the priority call information is contained, the radio base station eNodeB determines whether or not resources necessary for RAB setup on a relocation target RAT (Radio Access Technology), i.e., on UTRAN are available in step S106.

When determining that such resources are available, the radio base station eNodeB preferentially reserves resources for the E-RAB for the prioritized mobile station UE and allocates the resources to the E-RAB for the prioritized mobile station UE in the case where the resources necessary for E-RAB setup are acquired, in step S107.

On the other hand, when determining that such resources are not available, the radio base station eNodeB aborts the CSFB procedure (PS HO procedure) and transitions to a "Release with Redirection procedure" in step S108.

For example, in the "Release with Redirection procedure," the radio base station eNodeB may send the mobility management node MME an "Initial UE Context Setup Response" containing error information indicating the transition to the "Release with Redirection procedure."

In the above procedure, the processing in step S106 may be omitted. In this case, when determining that the priority call information is contained in step S104, the radio base station eNodeB may preferentially reserve resources for the E-RAB for the prioritized mobile station UE, and may allocate the resources to the E-RAB for the prioritized mobile station UE in the case where the resources necessary for E-RAB setup are acquired, in step S107.

Secondly, a second example of the priority control processing for the "Initial UE Context Setup Request" is explained in reference to FIG. 4.

As shown in FIG. 4, when the radio base station eNodeB receives an "Initial UE Context Setup Request" in step S201, the radio base station eNodeB determines whether or not the priority call information is contained in the "Initial UE Context Setup Request" in step S202.

When determining that the priority call information is not contained, the radio base station eNodeB performs usual processing of allocating resources to an E-RAB in step S203.

Here, if the radio base station eNodeB cannot allocate the resources to the E-RAB, the radio base station eNodeB transmits a "Negative Response" indicating that effect to the mobility management node MME.

On the other hand, when determining that the priority call information is contained, the radio base station eNodeB determines whether or not resources necessary for RAB setup on a relocation target RAT, i.e., on UTRAN are available in step S204.

When determining that such resources are available, the radio base station eNodeB preferentially allocates resources to the E-RAB for the prioritized mobile station UE in step S205.

Here, when the resources necessary for E-RAB setup on E-UTRAN are not available, the radio base station eNodeB releases the resources allocated to a non-prioritized mobile station UE and preferentially allocates the resources to the E-RAB for the prioritized mobile station UE.

On the other hand, when such resources are not available, the radio base station eNodeB aborts the CSFB procedure (PS HO procedure) and transitions to the "Release with Redirection procedure" in step S206.

For example, in the "Release with Redirection procedure," the radio base station eNodeB may send the mobility management node MME an "Initial UE Context Setup Response" containing error information indicating the transition to the "Release with Redirection procedure."

Here, the processing in step S204 may be performed at a time point A in FIG. 4. In this case, when determining that the aforementioned resources are available in step S204, the radio base station eNodeB may perform usual processing of allocating the resources to the E-RAB. In contrast, when determining that the aforementioned resources are not available in step S204, the radio base station eNodeB may abort the CSFB procedure (PS HO procedure) and transition to the "Release with Redirection procedure" in step S206.

In this case, when determining the priority call information is contained instep S202, the radio base station eNodeB may preferentially allocate the resources to the E-RAB for the prioritized mobile station UE in step S205.

Here, when resources necessary for E-RAB setup on E-UTRAN are not available, the radio base station eNodeB may release the resources allocated to a non-prioritized mobile station UE and preferentially allocate the resources to the E-RAB for the prioritized mobile station UE.

Returning to FIG. 2, after the E-RAB is set up between the radio base station eNodeB and the prioritized mobile station UE in step S1006, the radio base station eNodeB transmits an "Initial UE Context Setup Response" to the mobility management node MME in step S1007.

The mobility management node MME transmits a "GTPv2 Modify Bearer Request" to the serving gateway device S-GW in step S1008 and the serving gateway device S-GW transmits a "GTPv2 Modify Bearer Response" to the mobility management node MME in step S1009.

In step S1010, the radio base station eNodeB sends the mobility management node MME a "Handover Required" containing "Cause," "Target RNC Identifier," "Source eNodeB Identifier," "Source to Target Transparent Container," and the like.

Here, the "Source to Target Transparent Container" contains the aforementioned priority call information.

In step S1011, the mobility management node MME sends the packet switch SGSN a "Forward Relocation Request" containing the "Source to Target Transparent Container."

Here, the mobility management node MME generates the "Forward Relocation Request" containing the whole "Source to Target Transparent Container" in the received "Handover Required" and transmits the "Forward Relocation Request" to the packet switch SGSN.

Instead, the mobility management node MME may detect that the call is to be prioritized in a method like the one described in step S1004, generate the "Forward Relocation Request" containing the priority call information and the like, and transmit the "Forward Relocation Request" to the packet switch SGSN.

In step S1012, the packet switch SGSN transmits a "Relocation Request" containing the "Source to Target Transparent Container" to the radio network controller RNC.

In this step, the packet switch SGSN generates the "Relocation Request" containing the whole "Source to Target Transparent Container" in the received "Forward Relocation Request" and transmits the "Relocation Request" to the radio network controller RNC.

Alternatively, the packet switch SGSN may detect the priority call information contained in received "Forward Relocation Request," generate the "Relocation Request" containing the priority call information and the like and transmit the "Relocation Request" to the radio network controller RNC.

In step S1013, the radio network controller RNC performs the priority control processing for a "Relocation Request" thus received.

Figure 5:
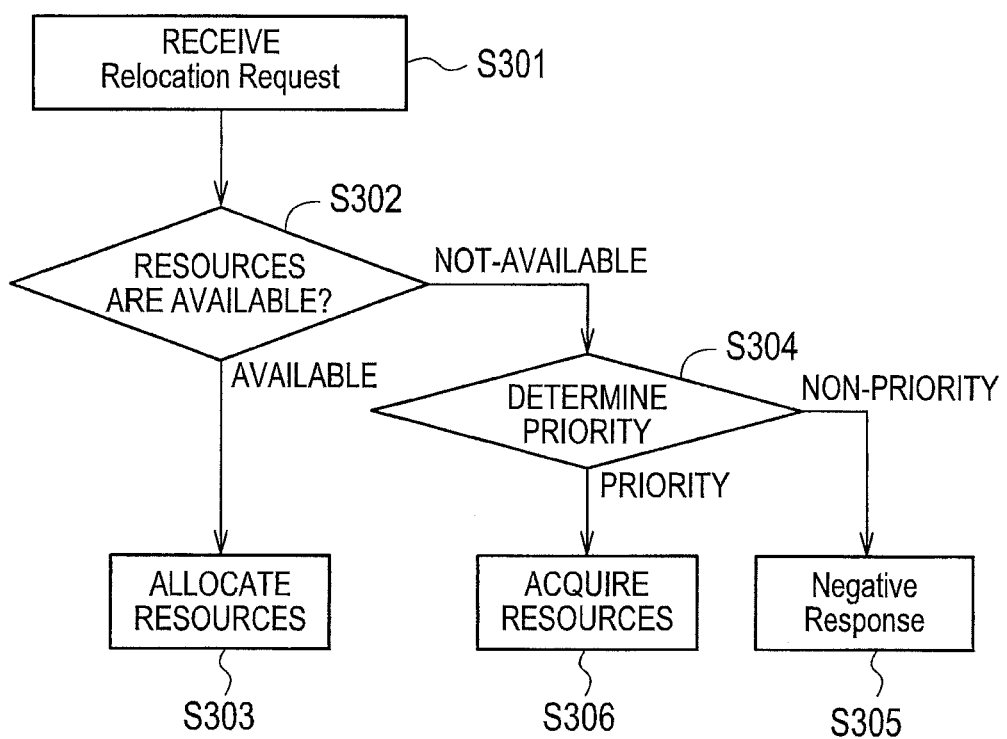
FIG. 5 is a flowchart showing an operation of a radio network controller RNC according to the first embodiment of the present invention.
Figure 6:
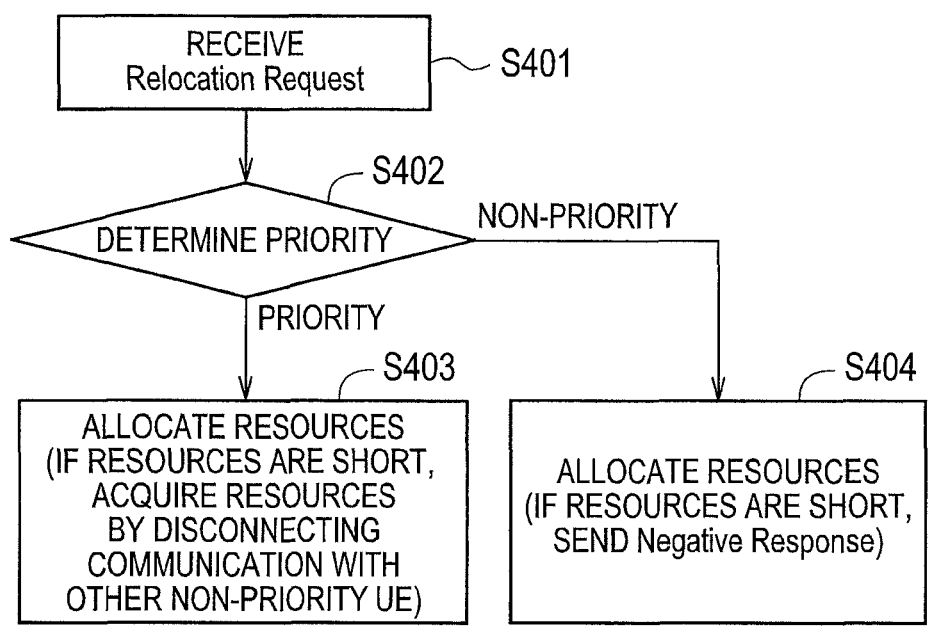
FIG. 6 is a flowchart showing an operation of the radio network controller RNC according to the first embodiment of the present invention.

Here, the priority control processing for a "Relocation Request" is explained in reference to FIGS. 5 and 6.

Firstly, a first example of the priority control processing for a "Relocation Request" is explained by referring to FIG. 5.

As shown in FIG. 5, when the radio network controller RNC receives a "Relocation Request" in step S301, the radio network controller RNC determines whether or not resources necessary for RAB setup are available in step S302.

When determining that such resources are available, the radio network controller RNC performs usual processing of allocating the resources to the RAB in step S303.

On the other hand, when determining that such resources are not available, the radio network controller RNC determines whether or not the priority call information is contained in the "Relocation Request" in step S304.

When determining that the priority call information is contained, the radio network controller RNC allocates the resources to the RAB for the prioritized mobile station UE, if the resources necessary for RAB setup are acquired from the resources reserved in advance for the RAB for the prioritized mobile station UE, in step S306.

On the other hand, when determining that the priority call information is not contained, the radio network controller RNC transmits a "Negative Response" indicating that effect to the packet switch SGSN in step S305.

Secondly, a second example of the priority control processing for a "Relocation Request" is explained in reference to FIG. 6.

As shown in FIG. 6, when the radio network controller RNC receives a "Relocation Request" in step S401, the radio network controller RNC determines whether or not the priority call information is contained in the "Relocation Request" in step S402.

When determining that the priority call information is contained, the radio network controller RNC preferentially allocates resources to the E-RAB for the prioritized mobile station UE in step S403.

In this step, if the resources necessary for RAB setup on UTRAN are not available, the radio network controller RNC releases the resources allocated to a non-prioritized mobile station UE and allocates the resources to the RAB for the prioritized mobile station UE.

On the other hand, when determining that the priority call information is not contained, the radio network controller RNC performs usual processing of allocating resources to the RAB in step S404.

In this step, when the resources cannot be allocated to the RAB, the radio network controller RNC transmits a "Negative Response" indicating that effect to the packet switch SGSN.

Returning to FIG. 2, after the radio network controller RNC successfully allocates the resources to the RAB for the prioritized mobile station UE, the radio network controller RNC sends the packet switch SGSN a "Relocation Request Acknowledge" in which the priority call information is contained in an information element addressed to the radio base station eNodeB in step S1014.

In step S1015, the packet switch SGSN sends the mobility management node MME a "Forward Relocation Response" in which the priority call information is contained in an information element addressed to the radio base station eNodeB.

In step S1016, the mobility management node MME sends the radio base station eNodeB a "Handover Command" in which the priority call information is contained in an information element addressed to the radio base station eNodeB.

In step S1017, the radio base station eNodeB sends the prioritized mobile station UE a "HO from E-UTRAN Command" containing the "CSFB Indicator" and the priority call information.

In step S1018, the prioritized mobile station UE performs priority control processing for a "HO from E-UTRAN Command" thus received. Here, the priority control processing for a "HO from E-UTRAN Command" is explained in reference to FIG. 7.

Figure 7:
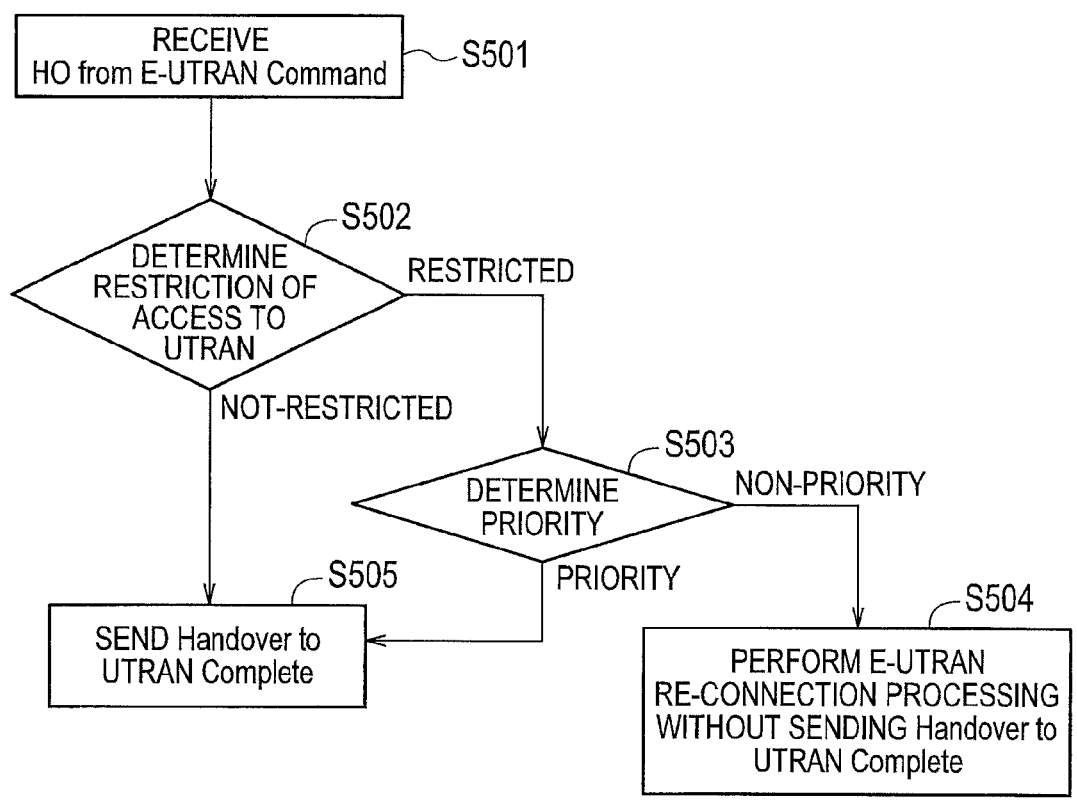
FIG. 7 is a flowchart showing an operation of a mobile station UE according to the first embodiment of the present invention.

As shown in FIG. 7, when a mobile station UE (for example, a prioritized mobile station UE) receives a "HO from E-UTRAN Command" in step S501, the mobile station UE determines whether or not an access to UTRAN is restricted in step S502.

Here, the mobile station UE may determine whether or not the access to UTRAN is restricted based on an information element in the "HO from E-UTRAN Command" or may determine whether or not the access to UTRAN is restricted based on broadcast information in a cell under the control of the radio network controller RNC.

When determining that the access is restricted, the mobile station UE determines whether or not the priority call information is contained in the "HO from E-UTRAN Command" in step S503.

When determining that the priority call information is not contained, the mobile station UE determines that the CSFB procedure cannot be performed, and performs processing of re-connecting to E-UTRAN without transmitting a "Handover to UTRAN Complete" to the radio network controller RNC in step S504.

On the other hand, when determining that the priority call information is contained, the mobile station UE transmits a "Handover to UTRAN Complete" to the radio network controller RNC in step S505 (corresponding to S1019 shown in FIG. 2).

Meanwhile, when determining that the access is not restricted in step S502, the mobile station UE transmits the "Handover to UTRAN Complete" to the radio network controller RNC in step S505 (corresponding to S1019 shown in FIG. 2).

Incidentally, the processing in step S1018 may be omitted.

In step S1020, the radio network controller RNC performs priority control processing for the "Handover to UTRAN Complete" thus received.

For example, the radio network controller RNC may be configured to accept only the "Handover to UTRAN Complete" containing the priority call information when the RRC function or the like on the UTRAN side is congested.

When accepting the received "Handover to UTRAN Complete," the radio network controller RNC transmits a "Relocation Complete" to the packet switch SGSN in step S1021.

The packet switch SGSN transmits a "Forward Relocation Complete" to the mobility management node MME in step S1022, and the mobility management node MME transmits a "Forward Relocation Complete Acknowledge" to the packet switch SGSN in step S1023.

The packet switch SGSN transmits a "Modify Bearer Request" to the serving gateway device S-GW in step S1024 and the serving gateway device S-GW transmits a "Modify Bearer Response" to the packet switch SGSN in step S1025.

Figure 8:
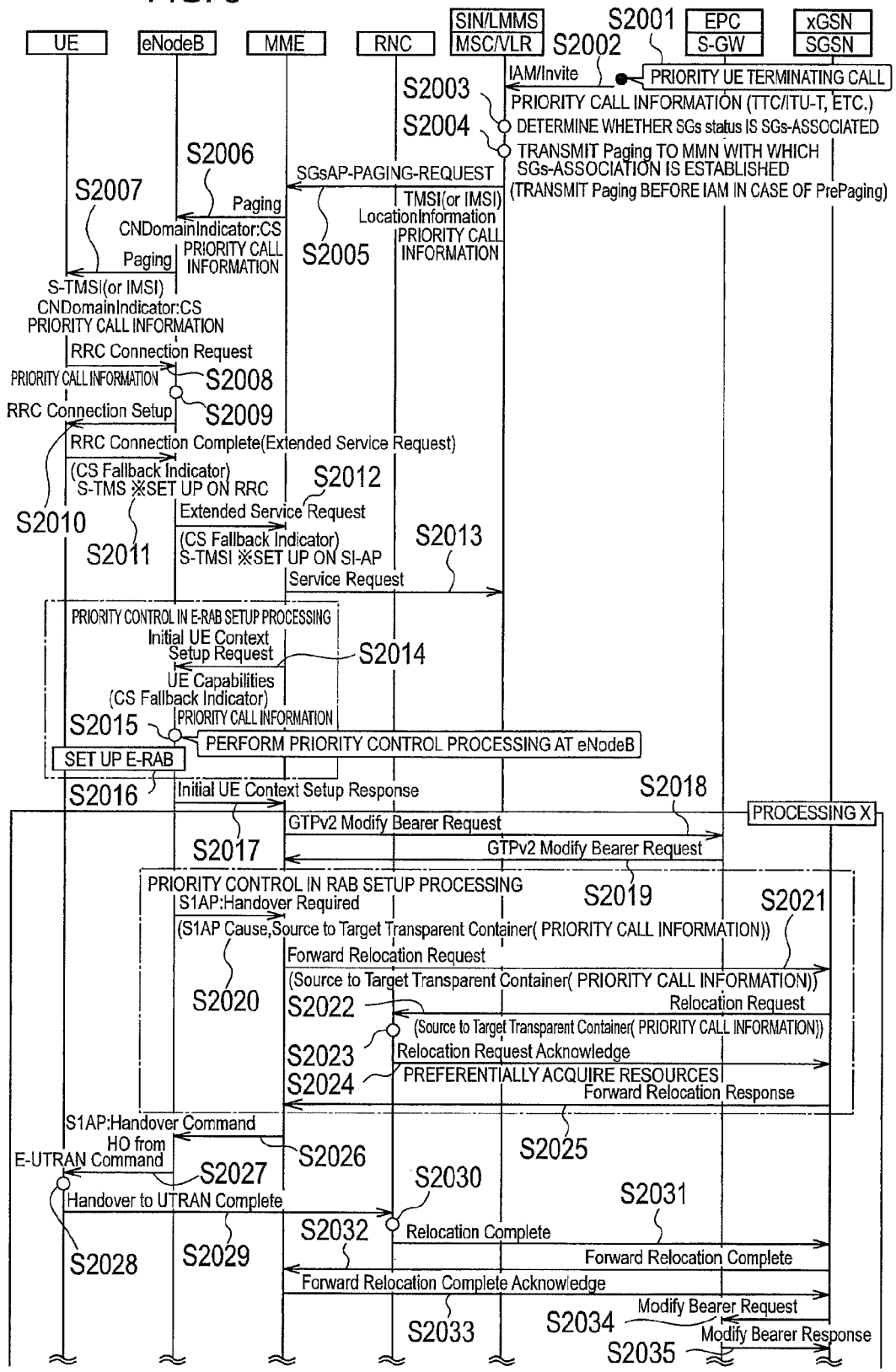
FIG. 8 is a sequence diagram showing operations of the mobile communication system according to the first embodiment of the present invention.

In the second place, in reference to FIG. 8, description will be provided for part of operations of a CSFB procedure involved in terminating call processing for a prioritized mobile station UE in Idle mode in the mobile communication system according to this embodiment.

As shown in FIG. 8, when a terminating call to a mobile station UE in Idle mode on E-UTRAN is made from a prioritized mobile station in step S2001, the circuit switching device MSC receives an "IAM/Invite" containing the priority call information in step S2002, checks that "SGs status" is "SGs-ASSOCIATED" in step S2003, and transmits a "SGsAP-PAGING-REQUEST (Paging)" containing the priority call information to the mobility management node MME with which SGs association is established in steps S2004 and S2005.

The mobility management node MME transmits a "Paging" containing the priority call information to the radio base station eNodeB in step 2006, and the radio base station eNodeB transmits the "Paging" containing the priority call information to the mobile station UE in step S2007.

In step S2008, the mobile station UE transmits a "RRC Connection Request" containing the priority call information to the radio base station eNodeB based on the received "Paging."

In step S2009, the radio base station eNodeB performs priority control processing for the received "RRC Connection Request."

For example, the radio base station eNodeB may be configured to accept only the "RRC Connection Request" containing the priority call information when the RRC function or the like on the E-UTRAN side is congested.

Incidentally, the radio base station eNodeB may transmit a "Paging" not containing the priority call information to the mobile station UE in step S2007. In this case, the radio base station eNodeB does not perform the priority control processing for the received "RRC Connection Request" in step S2009.

When accepting the received "RRC Connection Request," the radio base station eNodeB transmits a "RRC Connection Setup" to the mobile station UE in step S2010.

In step S2011, the mobile station UE sends the radio base station eNodeB a "RRC Connection Complete" in which a "CSFB Indicator" is contained in an "Extended Service Request."

The radio base station eNodeB transmits the "Extended Service Request" containing the "CSFB Indicator" to the mobility management node MME in step S2012, and the mobility management node MME transmits the "Service Request" to the circuit switching device MSC in step S2013.

The following operations in steps S2014 to S2035 are the same as the operations in steps S1004 to S1025 shown in FIG. 2.

Figure 9:
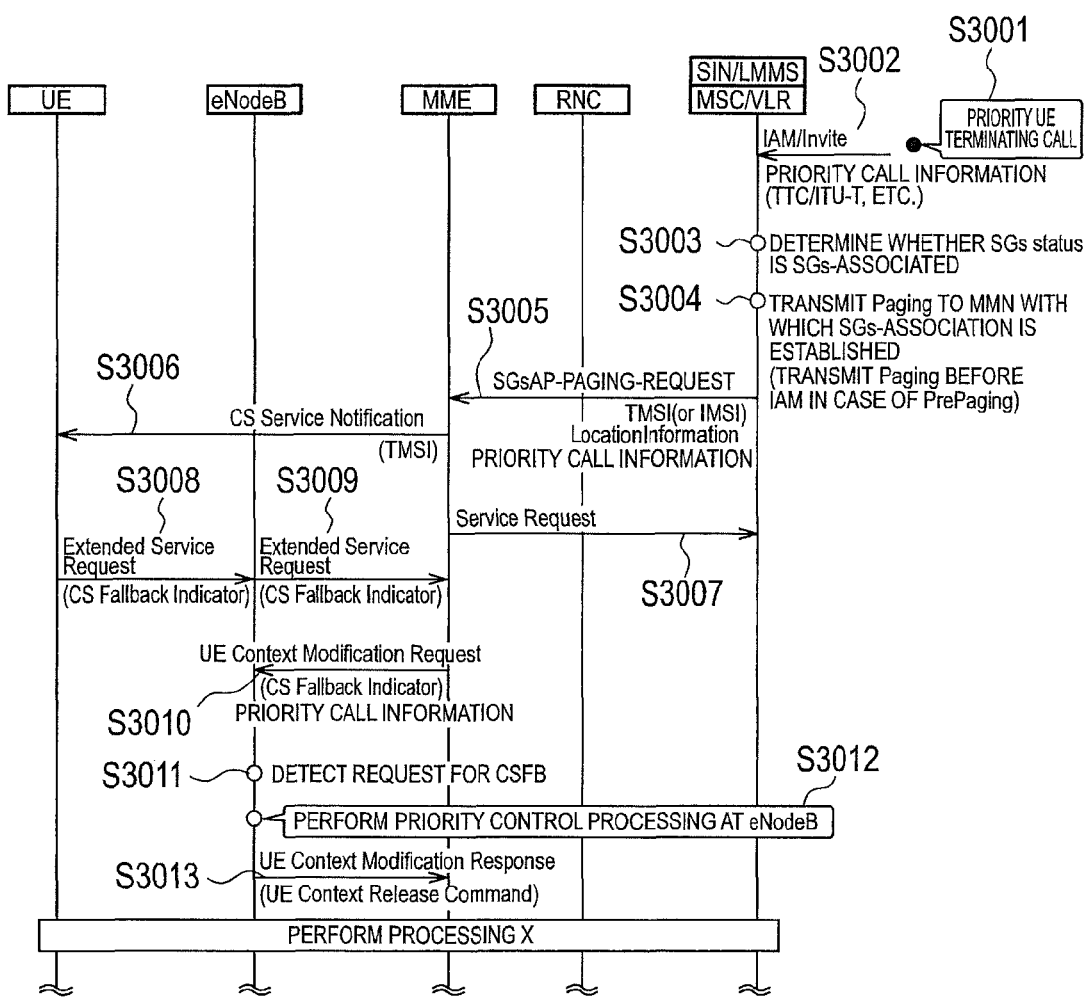
FIG. 9 is a sequence diagram showing operations of the mobile communication system according to the first embodiment of the present invention.

In the third place, in reference to FIG. 9, description will be provided for part of operations in a CSFB procedure involved in terminating call processing for a prioritized mobile station UE in Active mode in the mobile communication system according to this embodiment. In this CSFB procedure, the E-RAB for the prioritized mobile station UE is already set up.

The operations in steps S3001 to S3005 are the same as the operations in steps step S2001 to S2005 shown in FIG. 8.

The mobility management node MME transmits a "CS Service Notification" to the mobile station UE in step S3006, and transmits a "Service Request" to the circuit switching device MSC in step S3007.

The mobile station UE transmits an "Extended Service Request" containing a "CSFB Indicator" to the radio base station eNodeB in step S3008, and the radio base station eNodeB transmits the "Extended Service Request" containing the "CSFB Indicator" to the mobility management node MME in step S3009.

In step S3009, the mobility management node MME receives the "Extended Service Request" that is a response signal to step S3006. Upon this reception, the mobility management node MME transmits a "UE Context Modification Request" containing the "CSFB Indicator" and the priority call information to the radio base station eNodeB in step S3010.

When the radio base station eNodeB detects that the "CSFB Indicator" is contained in the received "UE Context Modification Request" in step S3011, the radio base station eNodeB performs priority control processing for the received "UE Context Modification Request" in step S3012.

Figure 10:
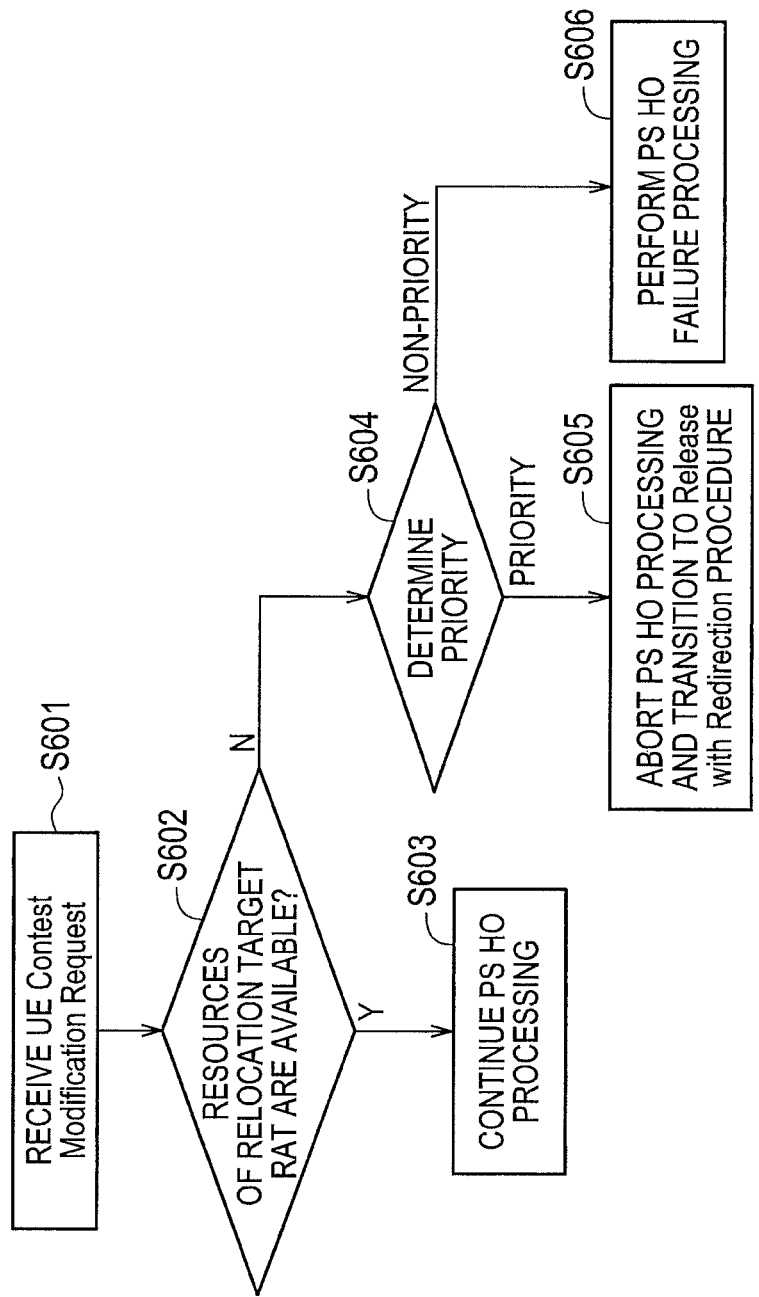
FIG. 10 is a flowchart showing an operation of the radio base station eNodeB in the mobile communication system according to the first embodiment of the present invention.
Figure 11:
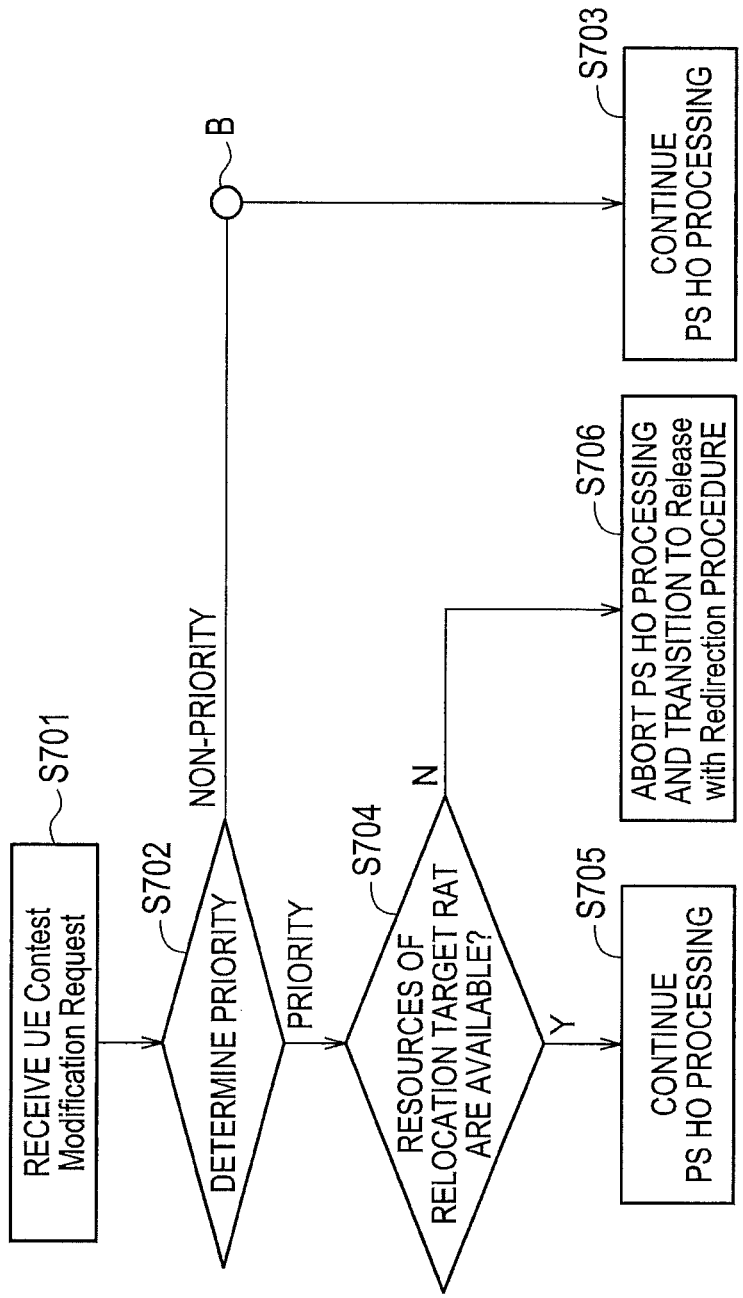
FIG. 11 is a flowchart showing an operation of the radio base station eNodeB in the mobile communication system according to the first embodiment of the present invention.
Figure 12:
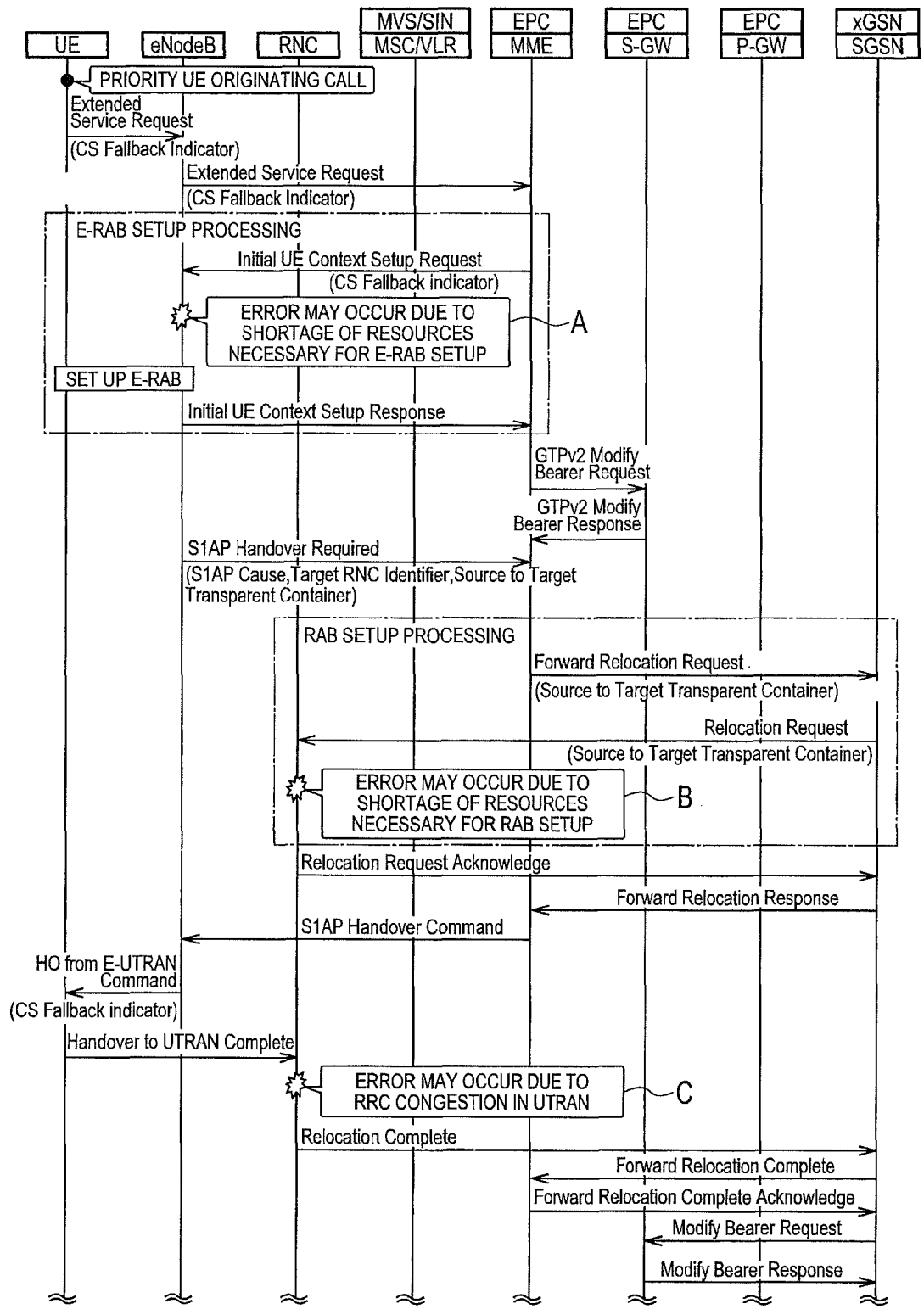
FIG. 12 is a diagram for explaining problems of a conventional mobile communication system.
Figure 13:
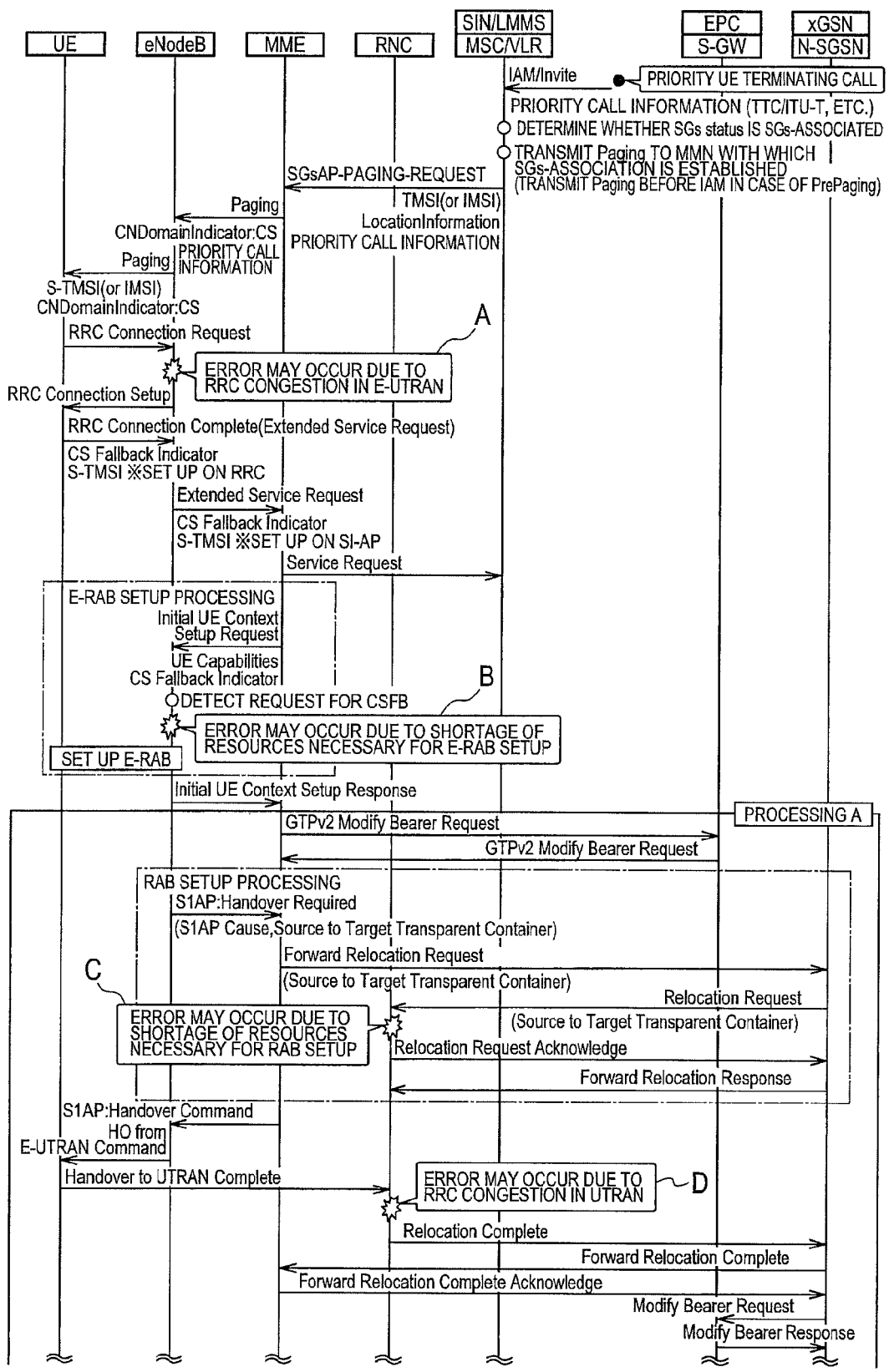
FIG. 13 is a diagram for explaining problems of the conventional mobile communication system.
Figure 14:
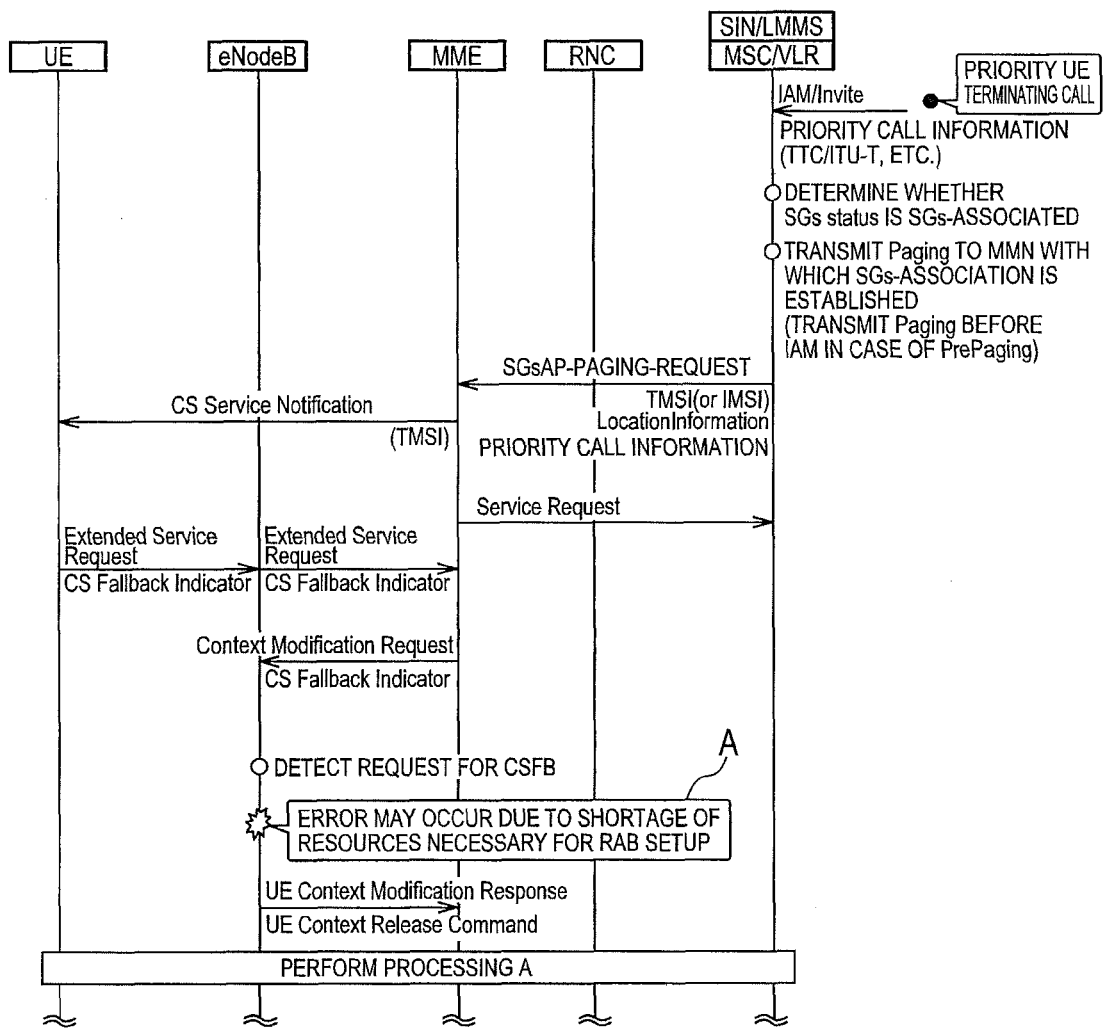
FIG. 14 is a diagram for explaining a problem of the conventional mobile communication system.

Here, the priority control processing for a "UE Context Modification Request" is explained in reference to FIGS. 10 and 11.

Firstly, a first example of the priority control processing for a "UE Context Modification Request" is described in reference to FIG. 10.

As shown in FIG. 10, when the radio base station eNodeB receives a "UE Context Modification Request" in step S601, the radio base station eNodeB determines whether or not resources necessary for RAB setup on a relocation target RAT, i.e., on UTRAN are available in step S602.

When determining that such resources are available, the radio base station eNodeB continues the CSFB procedure in step S603. Specifically, in step S3013 shown in FIG. 9, the radio base station eNodeB transmits a "UE Context Modification Response" to the mobility management node MME.

On the other hand, when determining that such resources are not available, the radio base station eNodeB determines whether or not the priority call information is contained in the "UE Context Modification Request" in step S604.

When determining that the priority call information is contained, the radio base station eNodeB aborts the CSFB procedure (PS HO procedure) and transitions to the "Release with Redirection procedure" in step S605.

In the "Release with Redirection procedure," for example, the radio base station eNodeB may send the mobility management node MME a "UE Context Modification Response" containing error information indicating the transition to the "Release with Redirection procedure."

On the other hand, when determining that the priority call information is not contained, the radio base station eNodeB performs failure processing for the CSFB procedure (PS HO procedure) in step S606.

Here, the processing in step S602 may be omitted. In this case, the radio base station eNodeB may be configured to transmit a "UE Context Modification Response" to the mobility management node MME in step S3013 when the radio base station eNodeB receives a "UE Context Modification Request."

Secondly, a second example of the priority control processing for a "UE Context Modification Request" is described in reference to FIG. 11.

As shown in FIG. 11, when the radio base station eNodeB receives a "UE Context Modification Request" in step S701, the radio base station eNodeB determines whether or not the priority call information is contained in the "UE Context Modification Request" in step S702.

When determining that the priority call information is not contained, the radio base station eNodeB continues the CSFB procedure (PS HO procedure) in step S703. Specifically, in step S3013 shown in FIG. 9, the radio base station eNodeB transmits the "UE Context Modification Response" to the mobility management node MME.

On the other hand, when determining that the priority call information is contained, the radio base station eNodeB determines whether or not the resources necessary for RAB setup on the relocation target RAT, i.e., on UTRAN are available in step S704.

When determining that such resources are available, the radio base station eNodeB continues the CSFB procedure (PS HO procedure) in step S705. Specifically, in step S3013, the radio base station eNodeB transmits the "UE Context Modification Response" to the mobility management node MME.

On the other hand, when determining that such resources are not available, the radio base station eNodeB aborts the CSFB procedure (PS HO procedure) and transitions to the "Release with Redirection procedure" in step S706.

In the "Release with Redirection procedure," for example, the radio base station eNodeB may send the mobility management node MME a "UE Context Modification Response" containing error information indicating the transition to the "Release with Redirection procedure."

Here, the processing in step S704 may be performed at a time point B in FIG. 11. In this case, the radio base station eNodeB may continue the CSFB procedure (PS HO procedure) in step S703 when determining that the above resources are available in step S704, and may abort the CSFB procedure (PS HO procedure) and transition to the "Release with Redirection procedure" in step S706 when determining that the above resources are not available in step S704.

In this case, when determining that the priority call information is contained in step S702, the radio base station eNodeB may continue the CSFB procedure (PS HO procedure) in step S705.

Returning to FIG. 9, the processing X shown in FIG. 8 is implemented thereafter.

The mobile communication system according to this embodiment can preferentially perform the E-RAB setup processing, the RAB setup processing, and the RRC connection establishment processing in the CSFB procedure for communications to be prioritized such as an originating call or a terminating call from a prioritized mobile station UE, and thereby can preferentially perform the CSFB procedure involved in the originating call processing or the terminating call processing for the prioritized mobile station UE.

The foregoing features of the present embodiment can be expressed as follows.

A first feature of the present embodiment is a mobile communication method including the steps of: transmitting an "Extended Service Request (a start request signal for circuit-switched type of communications)" from a mobile station UE in Idle mode (for example, a prioritized mobile station UE that is about to perform processing for an originating call to a prioritized mobile station UE or a non-prioritized mobile station UE, or a prioritized mobile station UE or a non-prioritized mobile station UE that is about to perform processing of a terminating call from a prioritized mobile station UE) to a mobility management node MME via a radio base station eNodeB (a radio access network apparatus) of the LTE system (a first communication system that does not support circuit-switched type of communications) ; transmitting an "Initial UE Context Setup Request (a radio bearer setup request signal)" from the mobile station UE to the radio base station eNodeB, the "Initial UE Context Setup Request containing priority call information and requesting setup of an E-RAB (a radio bearer of the first communication system) between the mobile station UE and the radio base station eNodeB; and preferentially allocating resources to the E-RAB for the mobile station UE by the radio base station eNodeB based on the priority call information contained in the received "Initial UE Context Setup Request."

In the first feature of the present embodiment, the method may include the steps of: after the E-RAB for the mobile station UE is set up, transmitting a "Handover Required/Forward Relocation Request (handover request signal)" containing the priority call information from the radio base station eNodeB to a packet switch SGSN of a 2G/3G system (a second communication system that supports circuit-switched type of communications) via the mobility management node MME; transmitting a "Relocation Request (handover request signal)" containing the priority call information from the packet switch SGSN to a radio network controller RNC (a radio access network apparatus of the second communication system); and preferentially allocating resources to a RAB (a radio bearer of the second communication system) between the mobile station UE and the radio network controller RNC by the radio network controller RNC based on the priority call information contained in the received "Relocation Request."

In the first feature of the present embodiment, the method may include the steps of: after the resources are allocated to the RAB for the mobile station UE, transmitting a "Relocation Request Acknowledge (a handover request acknowledge signal)" containing the priority call information from the radio network controller RNC to the packet switch SGSN; transmitting a "Forward Relocation Response/Handover Command (a handover request signal)" containing the priority call information from the packet switch SGSN to the radio base station eNodeB via the mobility management node MME; transmitting a "HO from E-UTRAN Command (a handover request signal)" containing the priority call information from the radio base station eNodeB to the mobile station UE; and transmitting a "Handover to UTRAN Complete (a handover request signal acknowledge signal)" from the mobile station UE to the radio network controller RNC if the priority call information is contained in the received "HO from E-UTRAN Command," even though an access to the 2G/3G system is restricted.

In the first feature of the present embodiment, the method may include the steps of: after the resources are allocated to the RAB for the mobile station UE, transmitting a "Relocation Request Acknowledge" containing the priority call information from the radio network controller RNC to the packet switch SGSN; transmitting the "Forward Relocation Response/Handover Command" containing the priority call information from the packet switch SGSN to the radio base station eNodeB via the mobility management node MME; transmitting the "HO from E-UTRAN Command" containing the priority call information from the radio base station eNodeB to the mobile station UE; transmitting the "Handover to UTRAN Complete" containing the priority call information from the mobile station UE to the radio network controller RNC; and preferentially accepting the "Handover to UTRAN Complete" by the radio network controller RNC based on the priority call information contained in the received "Handover to UTRAN Complete."

A second feature of the present embodiment is a mobile communication method summarized as including the steps of: transmitting an "Extended Service Request" from a mobile station UE having an E-RAB already set up between the mobile station UE and a radio base station eNodeB (that is, a mobile station UE in Active mode) to a mobility management node MME via the radio base station eNodeB; transmitting a "UE Context Modification Request (a setting modification request signal)" containing priority call information from the mobility management node MME to the radio base station eNodeB; determining by the radio base station eNodeB whether or not there are available resources in the 2G/3G system in response to the received "UE Context Modification Request;" and even when it is determined that there are not available resources in the 2G/3G system, performing processing of releasing the E-RAB by the radio base station eNodeB if the priority call information is contained in the "UE Context Modification Request."

A third feature of the present embodiment is a radio base station eNodeB summarized as being configured to: transmit an "Extended Service Request" received from a mobile station UE in Idle mode to a mobility management node MME; receive an "Initial UE Context Setup Request" from the mobility management node MME, the "Initial UE Context Setup Request" containing priority call information and requesting setup of an E-RAB between the mobile station UE and the radio base station eNodeB; and preferentially allocate resources to the E-RAB for the mobile station UE based on the priority call information contained in the received "Initial UE Context Setup Request."

A fourth feature of the present embodiment is a radio base station eNodeB summarized as being configured to: send a mobility management node MME an "Extended Service Request" received from a mobile station having an E-RAB already set up between the mobile station UE and the radio base station eNodeB (that is, a mobile station UE in Active mode) ; determine whether or not there are available resources in the 2G/3G system in response to a "UE Context Modification Request" received from the mobility management node MME; and perform E-RAB release processing if priority call information is contained in the "UE Context Modification Request" even when there are not available resources in the 2G/3G system.

A fifth feature of the present embodiment is a radio network controller RNC summarized as being configured to: after an E-RAB between a mobile station UE and a radio base station eNodeB is set up, receive a "Forward Relocation Request" containing priority call information from the radio base station eNodeB via a mobility management node MME and a packet switch SGSN; and preferentially allocate resources to a RAB between the mobile station UE and the radio network controller RNC based on the priority call information contained in the received "Relocation Request."

A sixth feature of the present embodiment is a mobile station UE summarized by being configured to: transmit an "Extended Service Request" to a mobility management node MME via a radio base station eNodeB; and transmit a "Handover to UTRAN Complete" to a radio network controller RNC if priority call information is contained in a "HO from E-UTRAN Command" received from the radio base station eNodeB, even though an access to the 2G/3G system is restricted.

It should be noted that the aforementioned operations of the mobile station UE, the radio base station eNodeB, the radio network controller RNC, the mobility management node MME, the gateway device P-GW, the gateway device S-GW, the circuit switching device MSC, and the packet switch SGSN may be implemented by hardware, may be, implemented by a software module executed by a processor, or may be implemented by a combination of the two.

A software module may be provided in a storage medium in any format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such storage medium is connected to a processor in such a way that the processor can write and read information to and from the storage medium. Instead, the storage medium may be integrated in the processor. Alternatively, the storage medium and the processor may be integrated in an ASIC. The ASIC may be provided in the mobile station UE, the radio base station eNodeB, the radio network controller RNC, the mobility management node MME, the gateway device P-GW, the gateway device S-GW, the circuit switching device MSC, or the packet switch SGSN. Moreover, the storage medium and the processor may be provided as discrete components in the mobile station UE, the radio base station eNodeB, the radio network controller RNC, the mobility management node MME, the gateway device P-GW, the gateway device S-GW, the circuit switching device MSC or the packet switch SGSN.

Although the present invention have been hereinabove described in detail by using the foregoing embodiment, it is apparent to those skilled in the art that the present invention should not be limited to the embodiment specified in the present description. The present invention can be implemented as altered or modified embodiments without departing from the gist and scope of the present invention. Therefore, the statement in this description is for illustrative purpose, and is not intended to impose any limitation on the present invention.

INDUSTRIAL APPLICABILITY

According to the present invention, provided are a mobile communication method, a radio access network apparatus and a mobile station which enable preferential establishment of an E-RAB and a RAB as packet bearers in a CSFB procedure for communication to be prioritized such as an originating call or a terminating call from a prioritized mobile station, and enable priority control for an RRC signal in the CSFB procedure, as described above.

EXPLANATION OF REFERENCE NUMERAL eNodeB . . . radio base station
MME . . . mobility management node
UE . . . mobile station
P-GW, S-GW . . . gateway device
MSC . . . circuit switching device
SGSN . . . packet switch
RNC . . . radio network controller

The invention claimed is:

1. A mobile communication method comprising the steps of:
    transmitting a start request signal for circuit-switched type of communications from a mobile station to a mobility management node via a radio access network apparatus of a first communication system that does not support circuit-switched type of communications;
    transmitting a radio bearer setup request signal from the mobility management node to the radio access network apparatus of the first communication system, the radio bearer setup request signal containing priority call information and requesting setup of a radio bearer of the first communication system between the mobile station and the radio access network apparatus of the first communication system when the mobility management node receives the start request signal and determines that a circuit-switched fallback procedure is to be prioritized;
    notifying, by the radio access network apparatus of the first communication system, a radio access network apparatus of a second communication system of the priority call information via the mobility management node and a packet switch of the second communication system, the second communication system supporting circuit-switched type of communications; and
    preferentially allocating resources to a radio bearer of the second communication system between the mobile station and the radio access network apparatus of the second communication system, by the radio access network apparatus of the second communication system based on the notified priority call information.

2. A radio access network apparatus of a first communication system that does not support circuit-switched type of communications, wherein
    the radio access network apparatus is configured to send a mobility management node a start request signal for circuit-switched type of communications received from a mobile station, and
    when receiving a radio bearer setup request signal from the mobility management node which received the start request signal and determined that a circuit-switched fallback procedure is to be prioritized, the radio bearer setup request signal containing priority call information and requesting setup of a radio bearer of the first communication system between the mobile station and the radio access network apparatus of the first communication system, the radio access network apparatus notifies a radio access network apparatus of a second communication system of the priority call information via the mobility management node and a packet switch of the second communication system, the second communication system supporting circuit-switched type of communications.

3. A mobility management node, wherein
    the mobility management node is configured to receive a start request signal for circuit-switched type of communications from a mobile station via a radio access network apparatus of a first communication system that does not support circuit-switched type of communications, and
    the mobility management node determines whether or not to send the radio access network apparatus of the first communication system a radio bearer setup request signal containing priority call information and requesting setup of a radio bearer of the first communication system between the mobile station and the radio access network apparatus of the first communication system when the mobility management node receives the start request signal and determines that a circuit-switched fallback procedure is to be prioritized.

4. The mobility management node according to claim 3, wherein
    the mobility management node determines whether or not a circuit-switched fallback procedure is to be prioritized, based on at least one of connection cause information and connection type information contained in the start request signal for circuit-switched type of communications, and subscriber profile information held by the mobility management node.

* * * * *